US011533143B2

(12) United States Patent
Wei et al.

(10) Patent No.: US 11,533,143 B2
(45) Date of Patent: Dec. 20, 2022

(54) CONFIGURATION OF NON-ORTHOGONAL DMRS FOR UPLINK TRANSMISSION

(71) Applicants: Chao Wei, Beijing (CN); Qiaoyu Li, Beijing (CN); Peng Cheng, Beijing (CN); QUALCOMM Incorporated, San Diego, CA (US)

(72) Inventors: Chao Wei, Beijing (CN); Qiaoyu Li, Beijing (CN); Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 16/963,453

(22) PCT Filed: Feb. 6, 2019

(86) PCT No.: PCT/CN2019/074729
§ 371 (c)(1),
(2) Date: Jul. 20, 2020

(87) PCT Pub. No.: WO2019/154400
PCT Pub. Date: Aug. 15, 2019

(65) Prior Publication Data
US 2021/0152305 A1 May 20, 2021

(30) Foreign Application Priority Data
Feb. 9, 2018 (WO) ................ PCT/CN2018/075955

(51) Int. Cl.
*H04L 5/00* (2006.01)
*H04W 52/32* (2009.01)
*H04W 72/12* (2009.01)

(52) U.S. Cl.
CPC ......... *H04L 5/0048* (2013.01); *H04W 52/325* (2013.01); *H04W 72/1284* (2013.01)

(58) Field of Classification Search
CPC ... H04L 5/0048; H04L 5/0053; H04L 27/261; H04L 27/2614; H04L 5/0051;
(Continued)

(56) References Cited

U.S. PATENT DOCUMENTS

2008/0318608 A1* 12/2008 Inoue ................... H04L 5/0048
455/446
2011/0199961 A1* 8/2011 Narasimha .......... H04W 74/006
370/328
(Continued)

FOREIGN PATENT DOCUMENTS

| CN | 102404854 A | * | 4/2012 | ........... H04L 5/0037 |
| CN | 102404854 A | | 4/2012 | |

(Continued)

OTHER PUBLICATIONS

English translation of CN 102404854 (Year: 2012).*
(Continued)

*Primary Examiner* — Ian N Moore
*Assistant Examiner* — Sun Jong Kim
(74) *Attorney, Agent, or Firm* — Qualcomm Incorporated

(57) ABSTRACT

The present disclosure relates to wireless communications implemented by a user equipment (UE). The UE may receive a demodulation reference signal (DMRS) sequence grouping from a base station, select a DMRS sequence for transmission of DMRS based on the DMRS sequence grouping, and transmit uplink (UL) data along with the DMRS for UL transmission using contention-based protocol, wherein the DMRS is transmitted based on the selected DMRS sequence.

12 Claims, 13 Drawing Sheets

(58) Field of Classification Search
CPC ........... H04W 52/325; H04W 72/1284; H04W 72/04; H04W 52/281
See application file for complete search history.

(56) References Cited

U.S. PATENT DOCUMENTS

| | | | | |
|---|---|---|---|---|
| 2015/0131586 A1* | 5/2015 | Noh | ........................ | H04J 13/16 370/329 |
| 2016/0353424 A1 | 12/2016 | Stirling-Gallacher et al. | | |
| 2017/0195096 A1* | 7/2017 | Yamamoto | ............ | H04L 5/0051 |
| 2017/0339679 A1* | 11/2017 | Lee | ........................ | H04L 5/0053 |
| 2018/0006791 A1* | 1/2018 | Marinier | ............... | H04L 1/1861 |
| 2018/0160443 A1* | 6/2018 | Tang | ................. | H04W 72/0413 |
| 2019/0342061 A1* | 11/2019 | Kim | .................... | H04W 52/281 |

FOREIGN PATENT DOCUMENTS

| | | |
|---|---|---|
| CN | 107371254 A | 11/2017 |
| CN | 107623563 A | 1/2018 |
| WO | 2006011953 A2 | 2/2006 |
| WO | 2017171314 A1 | 10/2017 |
| WO | 2018021819 A1 | 2/2018 |

OTHER PUBLICATIONS

International Search Report and Written Opinion—PCT/CN2018/075955—ISA/EPO—dated Jul. 4, 2018.
International Search Report and Written Opinion—PCT/CN2019/074729—ISA/EPO—dated Apr. 28, 2019.
ZTE : "Group-Based Re-Ordering Method of ZC Sequence in RACH", R1-073595, 3GPP TSG RAN WG1 #50 Meeting, Athens, Greece, Aug. 20-24, 2007, 8 Pages, Section 2.

* cited by examiner $$\begin{bmatrix}
1.0000 & 0.7454 & 0.7454 & 0.3333 & 0.3333 & 0.3333 & 0.3333 & 0.3333 & 0.3333 & 0.3333 & 0.7454 & 0.7454 \\
0.7454 & 1.0000 & 0.3333 & 0.7454 & 0.3333 & 0.3333 & 0.3333 & 0.3333 & 0.3333 & 0.3333 & 0.3333 & 0.3333 \\
0.7454 & 0.3333 & 1.0000 & 0.3333 & 0.3333 & 0.7454 & 0.3333 & 0.3333 & 0.3333 & 0.3333 & 0.7454 & 0.7454 \\
0.3333 & 0.7454 & 0.3333 & 1.0000 & 0.3333 & 0.7454 & 0.3333 & 0.3333 & 0.3333 & 0.7454 & 0.3333 & 0.3333 \\
0.3333 & 0.3333 & 0.3333 & 0.3333 & 1.0000 & 0.7454 & 0.3333 & 0.7454 & 0.3333 & 0.3333 & 0.3333 & 0.3333 \\
0.3333 & 0.3333 & 0.7454 & 0.7454 & 0.7454 & 1.0000 & 0.3333 & 0.3333 & 0.3333 & 0.7454 & 0.3333 & 0.3333 \\
0.3333 & 0.3333 & 0.3333 & 0.3333 & 0.3333 & 0.3333 & 1.0000 & 0.3333 & 0.3333 & 0.3333 & 0.7454 & 0.7454 \\
0.3333 & 0.3333 & 0.3333 & 0.3333 & 0.7454 & 0.3333 & 0.3333 & 1.0000 & 0.3333 & 0.7454 & 0.3333 & 0.3333 \\
0.3333 & 0.3333 & 0.3333 & 0.3333 & 0.3333 & 0.3333 & 0.3333 & 0.3333 & 1.0000 & 0.3333 & 0.3333 & 0.3333 \\
0.3333 & 0.3333 & 0.3333 & 0.7454 & 0.3333 & 0.7454 & 0.3333 & 0.7454 & 0.3333 & 1.0000 & 0.3333 & 0.3333 \\
0.7454 & 0.3333 & 0.7454 & 0.3333 & 0.3333 & 0.3333 & 0.7454 & 0.3333 & 0.3333 & 0.3333 & 1.0000 & 0.7454 \\
0.7454 & 0.3333 & 0.7454 & 0.3333 & 0.3333 & 0.3333 & 0.7454 & 0.3333 & 0.3333 & 0.3333 & 0.7454 & 1.0000
\end{bmatrix}$$

$\{S_1, S_7, S_{11}\}$ in Group 1
$\{S_2, S_3, S_9\}$ in Group 2
$\{S_4, S_6, S_{10}\}$ in Group 3
$\{S_5, S_8, S_{12}\}$ in Group 4

CONFIGURATION OF NON-ORTHOGONAL DMRS FOR UPLINK TRANSMISSION

CROSS-REFERENCE TO RELATED APPLICATION

This application is a 35 U.S.C. § 371 National Phase Application of PCT Application No. PCT/CN2019/074729 filed Feb. 6, 2019, entitled "CONFIGURATION OF NON-ORTHOGONAL DMRS FOR UPLINK TRANSMISSION," which claims priority to PCT Application No. PCT/CN2018/075955 filed Feb. 9, 2018, entitled "CONFIGURATION OF NON-ORTHOGONAL DMRS FOR UPLINK TRANSMISSION." The disclosure of these prior applications are hereby incorporated by reference herein in their entirety.

BACKGROUND

Aspects of the present disclosure relate generally to wireless communication networks, and more particularly to a demodulation reference signal (DMRS) design for uplink transmission without L1 grant using non-orthogonal multiple access (NOMA).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems These multiple access technologies have been adopted in various telecommunication standards to provide a common protocol that enables different wireless devices to communicate on a municipal, national, regional, and even global level. For example, 5G new radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond.

One area of recent improvements has focused on uplink DMRS design, which may impact uplink channel estimation accuracy and eventually determine uplink reliability and throughput. In order to support a large number of user equipments (UEs) in multiple cells, wireless systems have generally relied on a large number of different DMRS sequences. A DMRS sequence may be defined by a cyclic shift (CS) of a base sequence which is dependent on a sequence length and a cell identity. As such CS and the orthogonal covering code (OCC) can be applied to the base sequence to generate multiple orthogonal sequences for a large number of UEs in multi-user multiple input multiple output (MU-MIMO) configuration. However, such an approach may not always be feasible for NOMA due to the large number of DMRS sequences required to support the large number of UEs that are typically in the wireless communication system.

SUMMARY

Aspects of the present disclosure provide techniques for grouping DMRS sequences based on one or more of cross correlation of sequences, the cubic metric or peak-to-average power ratio (PAPR). In accordance with this technique, the power control for transmissions of DMRS can be exploited to enhance sequence grouping. For example, a base station may group a plurality of UEs with similar power (e.g., received signal power) for sequences in a single group in order to facilitate joint channel estimation that can be applied for sequences in the same group due to low cross correlation of sequences. Different received power (e.g., UEs that are farther from the base station center and that are in cell center) UEs may be assigned with sequences in a different group but with high cross correlation.

Another technique of the present disclosure may rely on a composite sequence that is generated by concatenating two base sequences. In this instance, the base station may provide UEs with a pool of base sequences. For transmission of DMRS, the UEs may select two base sequences that may be transmitted in two consecutive slots or two DMRS symbols in a slot (e.g., the first base sequence in one slot and a second base sequence in another slot). By allowing the UE to select two base sequences, the network may reduce the probability of a collision that may occur when two UEs select the same base sequence.

Thus, in one example, a method for wireless communications implemented by a UE is disclosed. The method may include receiving a DMRS sequence grouping from the base station, selecting a DMRS sequence for transmission of DMRS based on the DMRS sequence grouping, and transmitting an uplink (UL) data along with the DMRS for uplink transmission using contention-based protocol. The DMRS may be transmitted based on the selected DMRS sequence.

In another example, an apparatus for wireless communications implemented by a UE is disclosed. The apparatus may include a memory configured to store instructions and a processor communicatively coupled with the memory. The processor may be configured to execute the instructions to receive a DMRS sequence grouping from the base station, select a DMRS sequence for transmission of DMRS based on the DMRS sequence grouping, and transmit an UL data along with the DMRS for uplink transmission using contention-based protocol, wherein the DMRS may be transmitted based on the selected DMRS sequence.

In another example, a method for wireless communications implemented by base station is disclosed. The method may include determining, at the base station, a cross correlation for a plurality of DMRS sequences for uplink transmission without L1 grant, grouping the plurality of DMRS sequences based on the cross correlation for the plurality of DMRS sequences, and transmitting a DMRS sequence grouping to the UE.

In another example, an apparatus for wireless communications implemented by a base station is disclosed. The apparatus may include a memory configured to store instructions and a processor communicatively coupled with the memory. The processor may be configured to execute the instructions to determine, at the base station, a cross correlation for a plurality of DMRS sequences for uplink transmission without L1 grant, group the plurality of DMRS sequences based on the cross correlation for the plurality of DMRS sequences, and transmit a DMRS sequence grouping to the UE.

Additionally, another method for wireless communications implemented by a base station is disclosed. The method may include receiving, at the base station, a first DMRS sequence from a UE during a first slot, receiving, at the base station, a second DMRS sequence from the UE during a second slot, determining a cyclic shift hopping on the first DMRS sequence during the first slot in order to identify a base sequence index of the second DMRS sequence in the second slot, determining a linkage between the first DMRS sequence and the second DMRS sequence based on the cyclic shift hopping, and determining the multiple access (MA) signature for a physical uplink shared channel (PUSCH) based on the linkage.

In another example, an apparatus for wireless communications implemented by a base station is disclosed. The apparatus may include a memory configured to store instructions and a processor communicatively coupled with the memory. The processor may be configured to execute the instructions to receive, at the base station, a first DMRS sequence from a UE during a first slot, receive, at the base station, a second DMRS sequence from the UE during a second slot, determining a cyclic shift hopping on the first DMRS sequence during the first slot in order to identify a base sequence index of the second DMRS sequence in the second slot, determine a linkage between the first DMRS sequence and the second DMRS sequence based on the cyclic shift hopping, and determine the parameter (e.g. the radio network temporary identifier (RNTI) and/or multiple access (MA) signature) for a PUSCH based on the linkage.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 3A illustrates an example of cross correlation between DMRS sequences that is utilized by a base station to group the DMRS sequences in accordance with features of the present disclosure;

DETAILED DESCRIPTION

Figure 1:
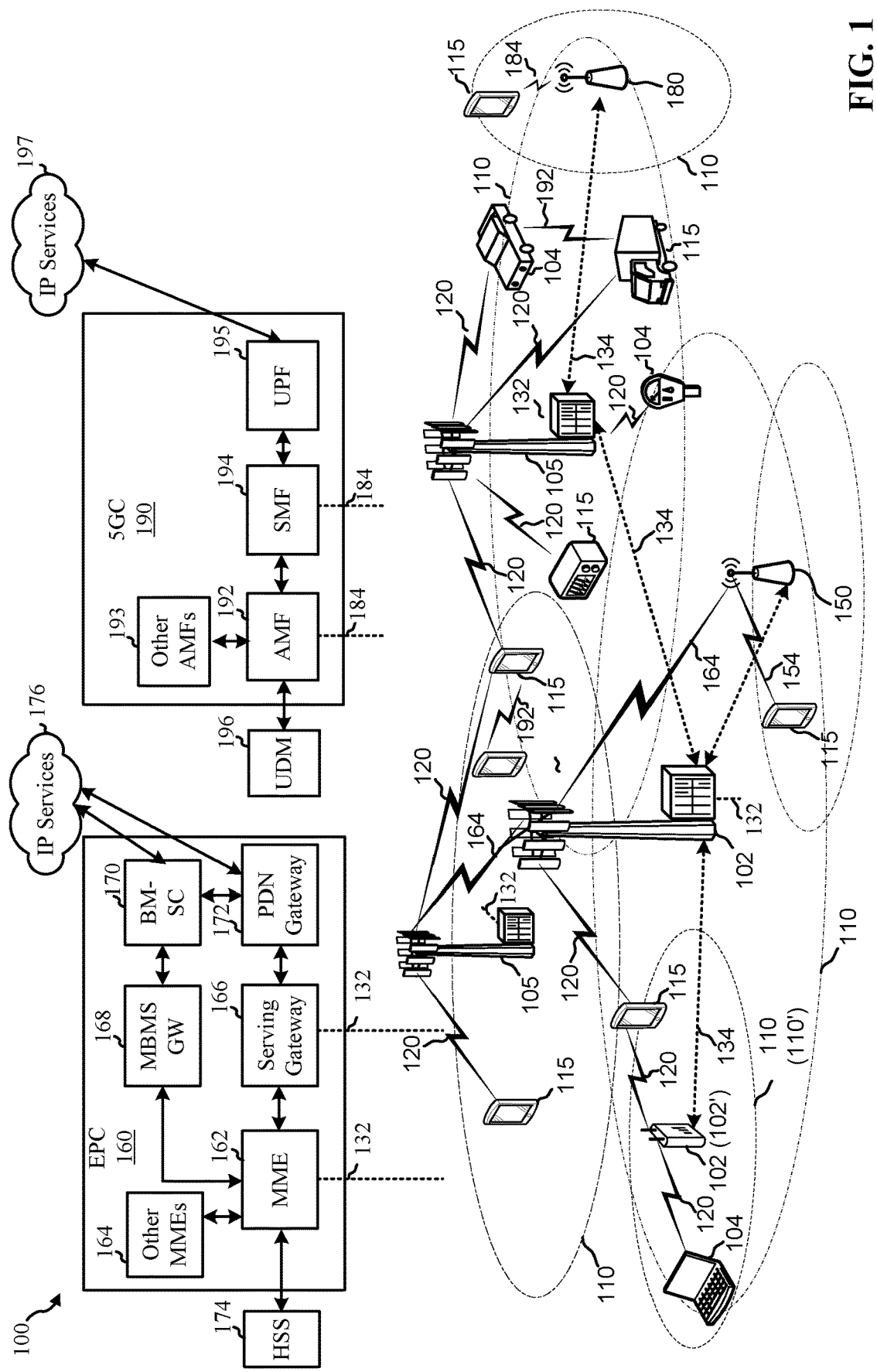
FIG. 1 illustrates an example of a wireless communications system in accordance with aspects of the present disclosure.

As discussed above, uplink DMRS design influences uplink channel estimation accuracy for PUSCH, and thus the reliability of the uplink transmissions and throughput. In order to support a large number of UEs that are typically part of the wireless communication system, current systems require a large number of DMRS sequences in order to minimize traffic collision between multiple UEs transmitting using the same DMRS sequence. However, such an approach is not always feasible.

Specifically, as illustrated in Table 1 below that shows the requirement on the number of DMRS sequences for various collision probabilities, in order to achieve a low collision probability, a large DMRS pool is required.

| (Required number of DMRSs for a given packet arrival rate in one time and frequency resource) | | | | | | |
|---|---|---|---|---|---|---|
| | Packet Arrival Rate | | | | | |
| | 1.0 | 2.0 | 4.0 | 6.0 | 8.0 | 10.0 |
| $\overline{P}_c = 0.1$ | 10 | 19 | 38 | 57 | 76 | 95 |
| $\overline{P}_c = 0.01$ | 100 | 199 | 398 | 597 | 796 | 995 |
| $\overline{P}_c = 0.001$ | 1000 | 1999 | 3998 | 5997 | 7996 | 9995 |
| $\overline{P}_c = 0.0001$ | 10000 | 19999 | 39998 | 59997 | 79996 | 99995 |
| $\overline{P}_c = 0.00001$ | 100000 | 199999 | 399998 | 599997 | 799996 | 999995 |

For example, for grant-free UL transmission, a larger number of different DMRS sequences are required to support a large amount of UEs. Typically, in order to manage multiple UEs in a system, the UEs are either preconfigured with exclusive DMRS such that at each transmission time interval (TTI), each active UE may transmit on the same time and frequency resources with preconfigured DMRS sequence, or the UEs may share a pool of DMRS such that at each TTI, an active UE may randomly select one DMRS sequence from the pool. In order to reduce the collision probability, the size of the pool must be sufficiently large to support this configuration.

However, a large DMRS pool with orthogonal sequences is not feasible in a wireless communication system since the DMRS capacity is limited by the assigned time and frequency resources. For example, in current LTE, DMRS occupies one symbol per time slot with a maximum number of 12 cyclic shifts results in a total number of 12 orthogonal DMRS sequences for a base sequence. Although time domain orthogonal covering code (OCC) can be used to increase the number of orthogonal DMRS sequences, the number of OCC is limited by the number of DMRS symbols, e.g., two for the length-2 OCC in LTE, and probably four for the length-4 OCC in NR where up to four DMRS symbols can be transmitted in a slot. Thus, in order to obtain a large number of DMRSs, non-orthogonal DMRS sequences with different base sequences should be considered.

Typically, the non-orthogonal DMRS sequences can provide a larger code space compared to fully orthogonal sequences. However, from reception perspective, the non-orthogonal DMRS may result in channel estimation performance degradation, and thus the overall system capacity performance loss when multiple users transmit the uplink data packet in the same physical resource using the non-orthogonal DMRS sequences with relatively high cross correlation. Thus, random assignment of a non-orthogonal DMRS sequence to UE may not be ideal due to potentially large cross correlation between two sequences (i.e., measure of similarity of any two sequences as a function of the displacement of one relative to the other).

Features of the present disclosure address the above-identified problem by implementing techniques to group the DMRS sequences for a plurality of UEs. In accordance with the first technique, the grouping of the DMRS sequences may be based on the cross correlation of the sequences. For example, sequences with low cross correlation may be selected for each of a plurality of groups and cross correlation between the groups may be larger than a threshold. In another example, the DMRS sequence grouping may be based on either the cubic metric or PAPR (e.g., sequences with similar PAPR may be selected for each group). The cubic metric may be a metric of the actual reduction in power capability, or power de-rating, of a typical power amplifier in a user equipment. The PAPR is the ratio of peak signal power to the average signal power.

Additionally or alternatively, features of the present disclosure may further facilitate power control to enhance DMRS sequence group. For example, same or similar received power may be configured for sequences grouped together such that joint channel estimation may be applied for DMRS sequences with low cross correlation in the same group. Further, different received power can be configured for DMRS sequences that may be grouped separately. Thus, in one instance, a first set of DMRS sequences may be grouped together for a set of first power setting and a second set of DMRS sequences may separately be grouped together for a set of second power settings, where the first set of DMRS sequences is different from the second set of DMRS sequences. In this instance, advanced channel estimation with interference cancellation may be used where the reconstructed received DMRS signals are iteratively cancelled for each UE and subsequently MMSE-IRC based channel estimation algorithm is performed. The successive interference cancellation (SIC) order may be based on the received (Rx) power.

In another example, the base station may provide a plurality of UEs a pool of DMRS sequences and allow each UE to select two base sequences that can be concatenated to construct a long composite sequence. For example, for M base sequences, the concatenation of two base sequences may generate M×M composite sequence, thereby increasing the pool size of DMRS sequences by magnitude of M (i.e., M to M×M). In this manner, the composite sequence may be transmitted by the UE in two consecutive time slots in one subframe (or alternatively two DMRS symbols in a slot). For example, the first base sequence may be transmitted in the first slot and a second base sequence may be transmitted in second slot. As such, different sets of composite sequences can be configured in different cells based on cross correlation between base sequences, and thus reduce interference possibilities between multiple UEs using the same DMRS sequence. Thus, features of the present disclosure provide an advantage over conventional systems in that the traffic collisions are minimized for transmission of DMRS by the UE, which results in improved channel estimation and data throughput between the base station and the UE.

Various aspects are now described in more detail with reference to the FIGS. 1-9. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN)) includes base stations 105, UEs 115, an Evolved Packet Core (EPC) 160, and a 5G Core (5GC) 190. The base stations 105 may include macro cells (high power cellular base station) and/or small cells (low power cellular base station). The macro cells include base stations. The small cells include femtocells, picocells, and microcells.

In some aspects, the base station 105 may include DMRS sequence management component 650 for grouping plurality of DMRS sequences based on cross correlation of the sequences and/or cubic metric and/or PAPR. The DMRS sequence management component 650 may exploit uplink power control in grouping different DMRS sequence one or more groups in accordance with various aspects of the present disclosure.

In some examples, one or more UEs 115 may include a communication management component 850 to perform one or more techniques of the present disclosure. Components and sub-components of the communication management component 850 perform one or more techniques of selecting a DMRS sequences from a set of DMRS sequences grouped in a pool. The communication management component 850 may transmit the DMRS using the selected DMRS sequence in an uplink to base station 105 to perform channel estimation.

The base stations 105 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 105 configured for 5G NR (collectively referred to as Next Generation RAN (NG-RAN)) may interface with 5GC 190 through backhaul links 184. In addition to other functions, the base stations 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 105 may wirelessly communicate with the UEs 115. Each of the base stations 105 may provide communication coverage for a respective geographic coverage area 110. There may be overlapping geographic coverage areas 110. For example, the small cell 102' may have a coverage area 110' that overlaps the coverage area 110 of one or more macro base stations 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 105 and the UEs 115 may include uplink (UL) (also referred to as reverse link) transmissions from a UE 115 to a base station 105 and/or downlink (DL) (also referred to as forward link) transmissions from a base station 102 to a UE 115. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 115 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 105, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 105 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 115 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, one or more UEs 115 may be configured for CV2X communications between UEs 115. The UEs 104 may include various devices related to vehicles and transportation. For example, the UEs 104 may include vehicles, devices within vehicles, and transportation infrastructure such as roadside devices, tolling stations, fuel supplies, or any other device that that may communicate with a vehicle. A UE 104 may act as either a host device or a client device for CV2X communication. A host UE 104 may advertise CV2X services supported by the host UE 104. A client UE 104 may also discover CV2X services supported by the host UE 104.

Aspects of the present disclosure address the above-identified problem by providing techniques for a communication management component 650 of a base station 105 to transmit a "short-page" message (e.g., paging indicators) to one or more UEs 115. The short-page message may be decoded by all UEs 115 in the paging cycle and identifies a subset of UEs 115 from the full set of UEs 115 that are paged by the base station. Upon decoding the short page transmitted by the base station 105, the paging management component 850 of the UE 115 may respond with a "short-page response" to the base station on a transmit beam that offers best signal quality (e.g., low signal-to-noise ratio). Thus, in this manner, the paging management component 850 of the UE 115, in response to receiving a short paging message, may provide feedback to the base station 105 such that the base station 105 may select a transmit beam for transmission for a subsequent long page message (or other communications). Features of the communication management component 350 of the base station 105 and the paging management component 550 of the UE 115 are described in more detail below.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2:
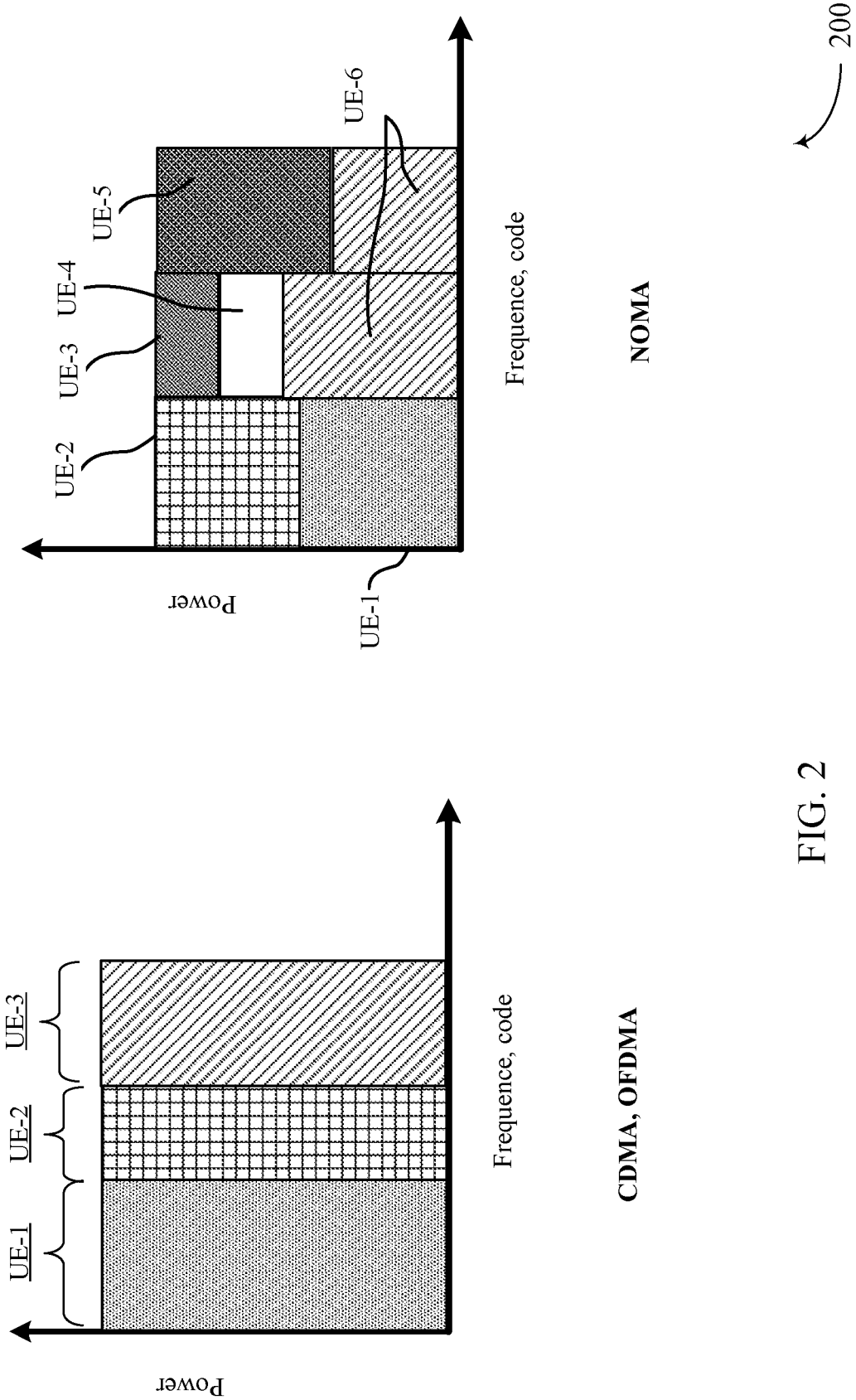
FIG. 2 illustrates an example of resource management for orthogonal transmission and non-orthogonal in accordance with features of the present disclosure.

FIG. 2 illustrates a diagram 200 of resource management for orthogonal transmission and NOMA in accordance with features of the present disclosure. Specifically, in the CDMA and OFDMA transmission, the one or more UEs are allocated full scope orthogonal resources of frequency, time or code to transmit. In contrast, for NOMA, the same allocation of both frequency and time resource is configured for multiple users, for example, two UEs can transmit on the same time/frequency resources using the non-orthogonal code and different transmission power settings. Thus, as illustrated, in FIG. 2, NOMA with short codes allows for six UEs on four resources with length-5 short codes utilization.

FIG. 3A illustrates an example of cross correlation 300 between DMRS sequences that are utilized by the base station to group the DMRS sequences in accordance with features of the present disclosure. Specifically, as noted above, random assignment of a non-orthogonal DMRS sequence to UE may be problematic due to potentially large cross correlation between two DMRS sequences. As such, it may be difficult for the base station to estimate the channels for the co-scheduled UEs where the DMRS sequences have large cross correlation. Table 2 illustrates the cross correlation for various DMRS sequence lengths.

TABLE 2

| | Cross Correlation (including all cyclic shifts) | | |
|---|---|---|---|
| | Mean | Max | Median |
| Length-3 | 0.5329 | 0.9107 | 0.4714 |
| Length-6 | 0.3540 | 0.7454 | 0.3550 |
| Length-12 | 0.2573 | 0.6755 | 0.2510 |
| Length-24 | 0.1830 | 0.4917 | 0.1748 |
| Length-36 | 0.1547 | 0.2679 | 0.1610 |

As such, in accordance with the first technique of the present disclosure, the base station may group a set of DMRS sequences from the plurality of DMRS sequences based on cross correlation of sequences. For example, sequences with low cross correlation may be selected for each group and cross correlation between the groups may be larger than a threshold. Additionally or alternatively, the base station may group the plurality of DMRS sequences based on cubic metric or PAPR. For example, sequences with similar PAPR may be selected for each control.

Figure 3B:
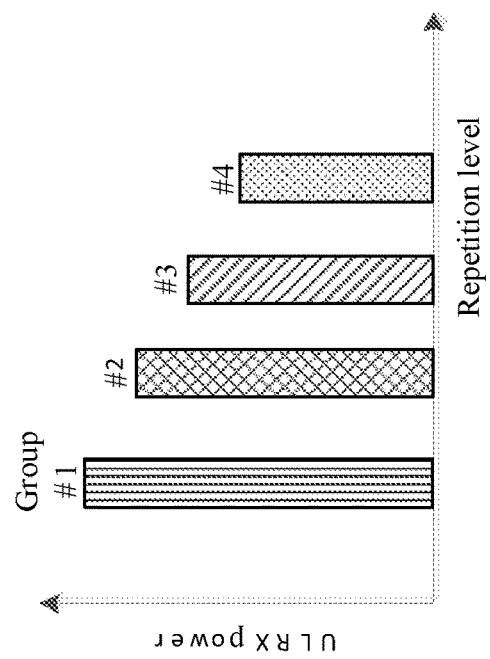
FIG. 3B illustrates an example of the power allocation for the UEs based on DMRS sequence grouping in accordance with features of the present disclosure.

In some examples, as illustrated in FIG. 3B, a base station may also utilize power control to facilitate the sequence grouping. For example, the same or similar received power may be allocated for sequences in the same group. This may facilitate joint channel estimation to be applied for sequences in the same group due to low cross correlation property. To that end, different received power for sequences may be allocated to different groups. As such, channel estimation with advanced interference cancellation may be used and the SIC order may be based on the received power.

In some implementations, the base station may broadcast the DMRS sequence grouping in system information block (SIB). For example, the base station may group a subset of sequences and the associated RSRP threshold (or repetition level for the associated UL data transmission) to the one or more UEs. For example, a first set of DMRS sequences {s1, s2, and s3) may be allocated for RSRP that is less than −100 dB and a second set of DMRS sequences {s4, s5, and s6} for RSRP greater than 100 dB. Thus, each UE in the cell may choose the DMRS group and sequence based on its RSRP (or the used repetition level for the associated data transmission).

In some examples, a base station may signal a group number and a sequence index determined from the RSRP measurement report or based on the configured repetition level used for data transmission. In some examples, the base station may also configure the transmit power for the assigned DMRS sequences.

Figure 4:
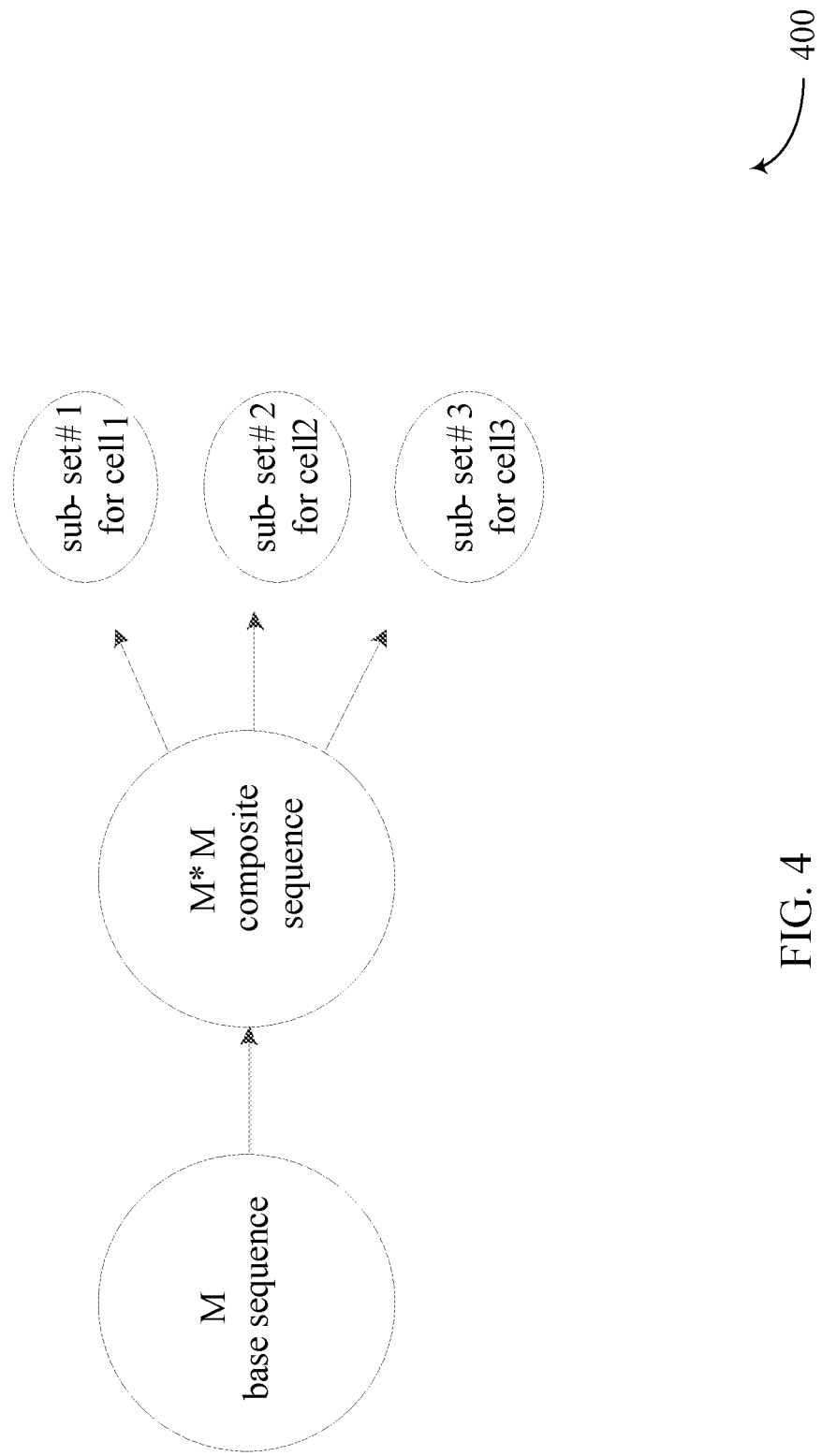
FIG. 4 illustrates an example composite sequence that is generated by concatenating a plurality of base sequences in accordance with features of the present disclosure

FIG. 4 illustrates an example composite sequence 400 that is generated by concatenating a plurality of base sequences in accordance with features of the present disclosure. In some examples, in order to ensure low probability of collision between multiple UEs selecting the same DMRS sequence that may impact channel estimation, the DMRS sequences may be selected by concatenating a plurality of base sequences (at least two, but may also include additional sequences combined together) to generate a composite sequence. For example, two base sequences may be concatenated to construct a single long composite sequence. By implementing this technique, the concatenation of two base sequences generates M×M composite sequence that would otherwise would only be limited to M (M being an integer). The greater number of available sequences may reduce the collision. The feature of the present disclosure provides an advantage over the approach by increasing the number of base sequences which may result in a significant increase of the receiver complexity for sequence detection.

In some examples, the composite sequences may be transmitted in multiple slots (e.g., two slots). For example, the first DMRS sequence may be transmitted in the first slot, and the second DMRS sequence may be transmitted in a second slot. As illustrated, different sets of composite sequences may be configured in different cells based on cross correlation between base sequences. Thus, once the base station has provided a pool of DMRS sequences for selection based on the grouping, the UE may randomly choose two base sequences, for example, to be transmitted in two slots (or alternatively two DMRS symbols in a slot). Such full collision may occur when the number of the selected base sequences are less than the number of UEs in both slots. In this instance, the probability of a full collision where at least two UEs select the same base sequence for both slots (i.e., first slot and second slot) would be lower or reduced.

A partial collision may also occur where the at least two UEs select the same DMRS sequence in one slot, but not the other. This is the case when the number of selected base sequences in one slot is equal to the number of UEs transmitted in that slot. Conversely, the likelihood of having no collisions is high when no duplicate UEs in the same cell select the same sequence for either slot. However, with implementation of these techniques, only full collision in both slots may lead to transmission failure. Indeed, even in case of partial collision where one of two slots has the same DMRS sequence as another UE, the base station may still be able to estimate channel from DMRS in the collision-free slot for the UEs. As such, the probability of the DMRS collision by implementation of the composite sequence in at least two slots is reduced by the power of two ($P^2$), where P is the collision probability for the non-composite sequence (e.g., using the same base sequences in both slots for all the UEs).

Figure 5A:
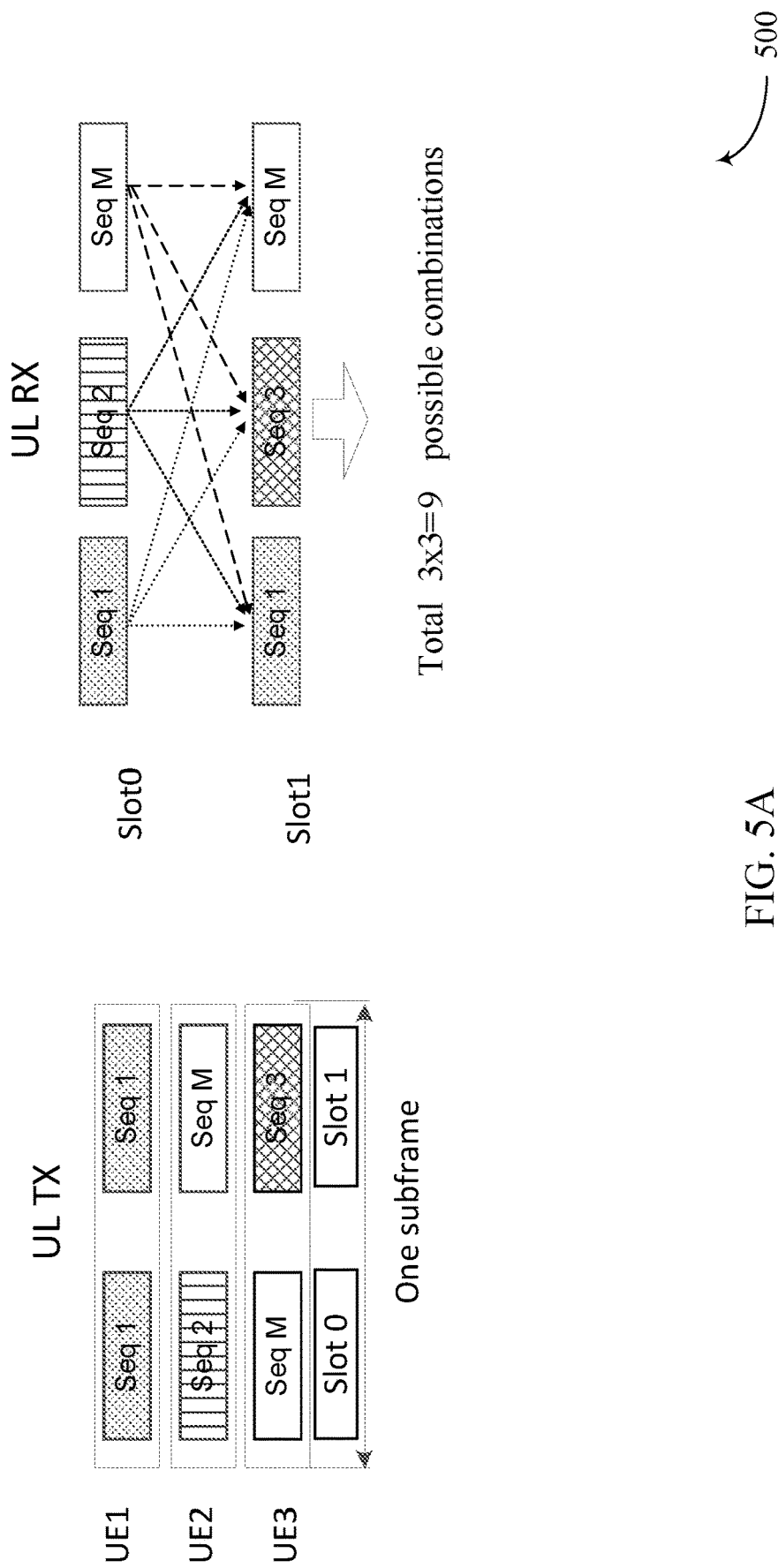
FIGS. 5A-5C illustrates an example means of identifying the linkage between two DMRS sequences that are received by the base station in two separate slots in accordance with aspects of the present disclosure.
Figure 5B:
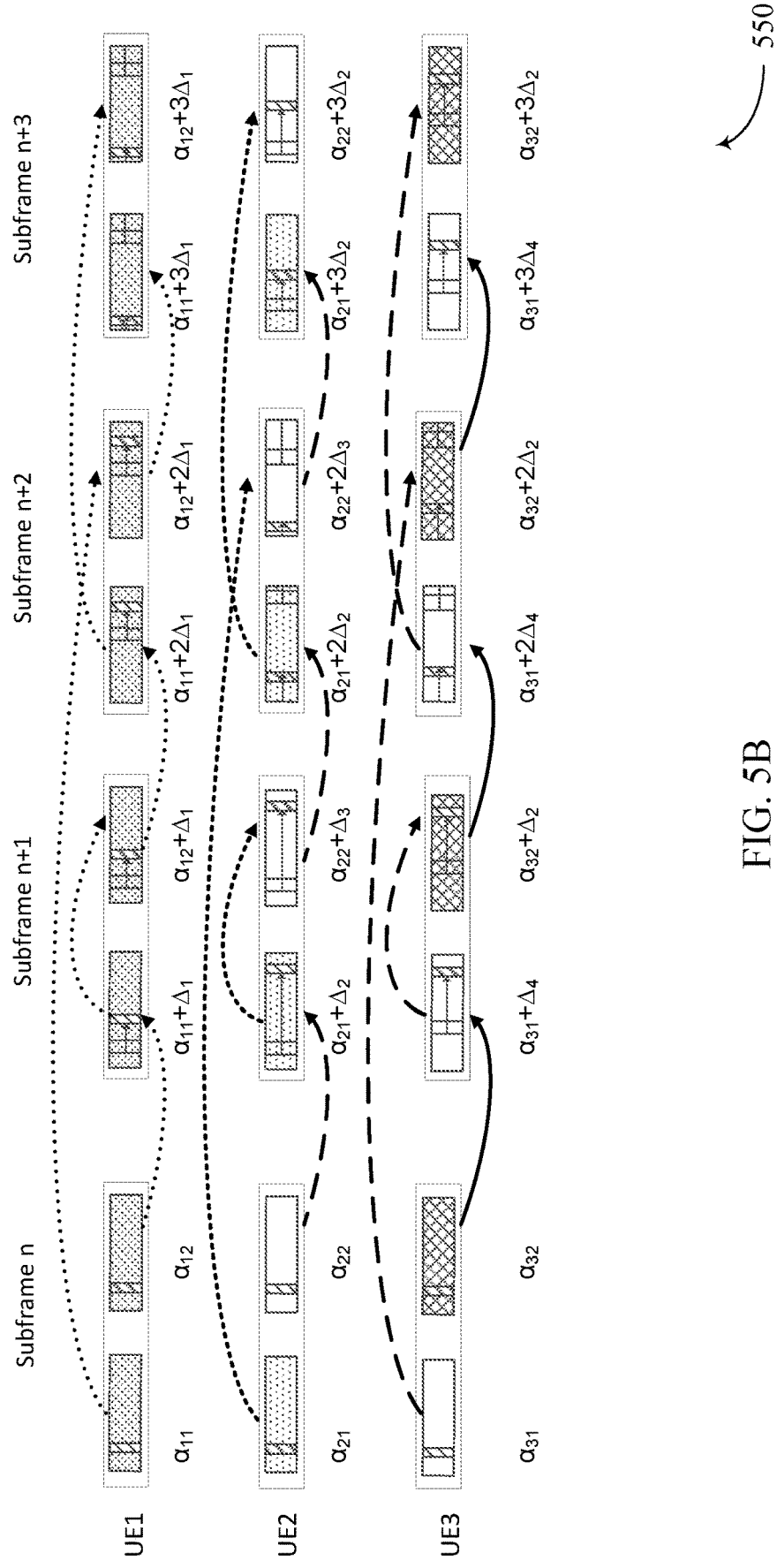
Figure 5C:
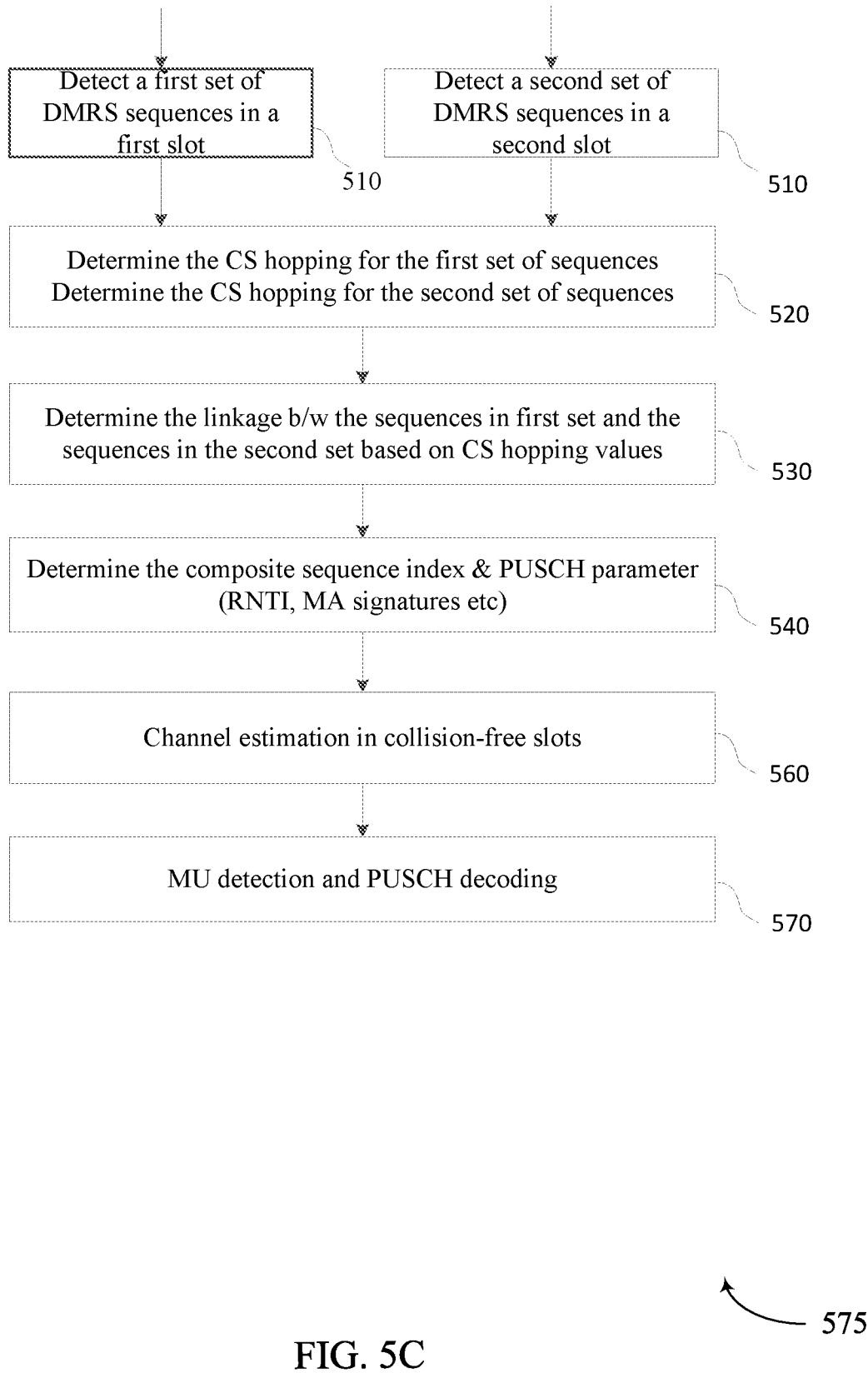

Now turning to FIGS. 5A-5C that illustrate an example of the system identifying the linkage between two base sequences that are received by the base station in two separate slots (or alternatively two DMRS symbols in a slot) in accordance with aspects of the present disclosure. Typically, when grant-free UL transmission is configured, there is one-to-one mapping between the DMRS sequence and the PUSCH parameters such as the RNTI and/or MA signature for NOMA (e.g., codebook, spreading code sequence, interleaver pattern etc). Since for grant-free transmission, when a UE performs random resource selection for uplink transmission, the base station does not have prior information about which UE is transmitted on the resource. In this case, the predefined DMRS to the PUSCH mapping can facilitate the receiver procedure of the base station 105. Upon receiving a composite DMRS sequence, the base station may be required to determine the linkage between the received two DMRS base sequences in order to identify the RNTI and MA signature used for PUSCH transmission. However, implementing this technique for composite DMRS sequence may be more challenging because it may be difficult to detect the composite sequence index from DMRS base sequences received in two slots when there are more than one DMRS sequences are received in each of the slots.

As illustrated in FIG. 5A, one solution may be to conduct an exhaustive search by hypothesizing all the combinations and CRC confirming data decoding results. For example, as illustrated, the base station may receive three DMRS sequences from three UEs during the first slot (slot 0), and another three DMRS sequences during the second slot (slot 1). One technique may involve attempting to identify all possible combinations (9 possible combinations in the illustrated example). However, such an approach may be resource intensive as the number of UEs in the cell increases.

FIG. 5B illustrates a cyclic shift hopping pattern 550 in accordance with features of the present disclosure in order to more effectively identify the received DMRS base sequences with the PUSCH. In such a solution, the cyclic shift hopping for one sequence may be based on the other base sequence index in the composite sequence. For example, the DMRS sequences in two slots of one subframe may be given by $r_{u1}^{\alpha 1}$ and $r_{u2}^{\alpha 2}$ where u1 and u2 are the index of base sequence, α1 and α2 are the cyclic shift in subframe n may be defined by $\alpha 1 = 2\pi n_{cs,1}/N$ and $\alpha 2 = 2\pi n_{cs,2}/N$:

$$n_{CS,1}(n) = \begin{cases} n_{\lambda,1} & n = 0 \\ (n_{CS,1}(n-1) + n_{PN}(u_2)) \bmod N & n > 0 \end{cases} \quad \text{Equation 1}$$

$$n_{CS,2}(n) = \begin{cases} n_{\lambda,2} & n = 0 \\ (n_{CS,2}(n-1) + n_{PN}(u_1)) \bmod N & n > 0 \end{cases} \quad \text{Equation 2}$$

In the above formulas that facilitate sequence specific cyclic shift hopping pattern over subframes, N may be the sequence length, and $n_{\lambda,1}$ and $n_{\lambda,2}$ are initial cyclic shift value provided by the higher layer signaling of the system. Thus, the linkage between the two base sequences may be determined from the associated cyclic shift hopping values, thereby allowing the base station to identify the composite sequence index for each UE in order to identify the MA signature used for data transmission.

FIG. 5C is a flowchart of an example method 575 that illustrates the cyclic shift hopping pattern employed by the base station in accordance with aspects of the present disclosure. At blocks 510, the method may include detecting a first set of DMRS sequences in first slot (or alternatively first DMRS symbol in a slot) and a second set of DMRS sequences in second slot (or alternatively second DMRS symbol in a slot).

At block 520, the method may include the base station determining the cyclic hopping values for sequences in first set and the second set. At block 530, the method may include determining the linkage between the sequences in two sets based on the cyclic hopping values. At block 540, the method may include determining the PUSCH parameters including RNTI and MA signature based on the linkage. At block 560, the method may include determining the collision-free slot and calculating channel estimation in collision-free slots. At block 570, the method may include performing multiple user detection and PUSCH decoding.

Figure 6:
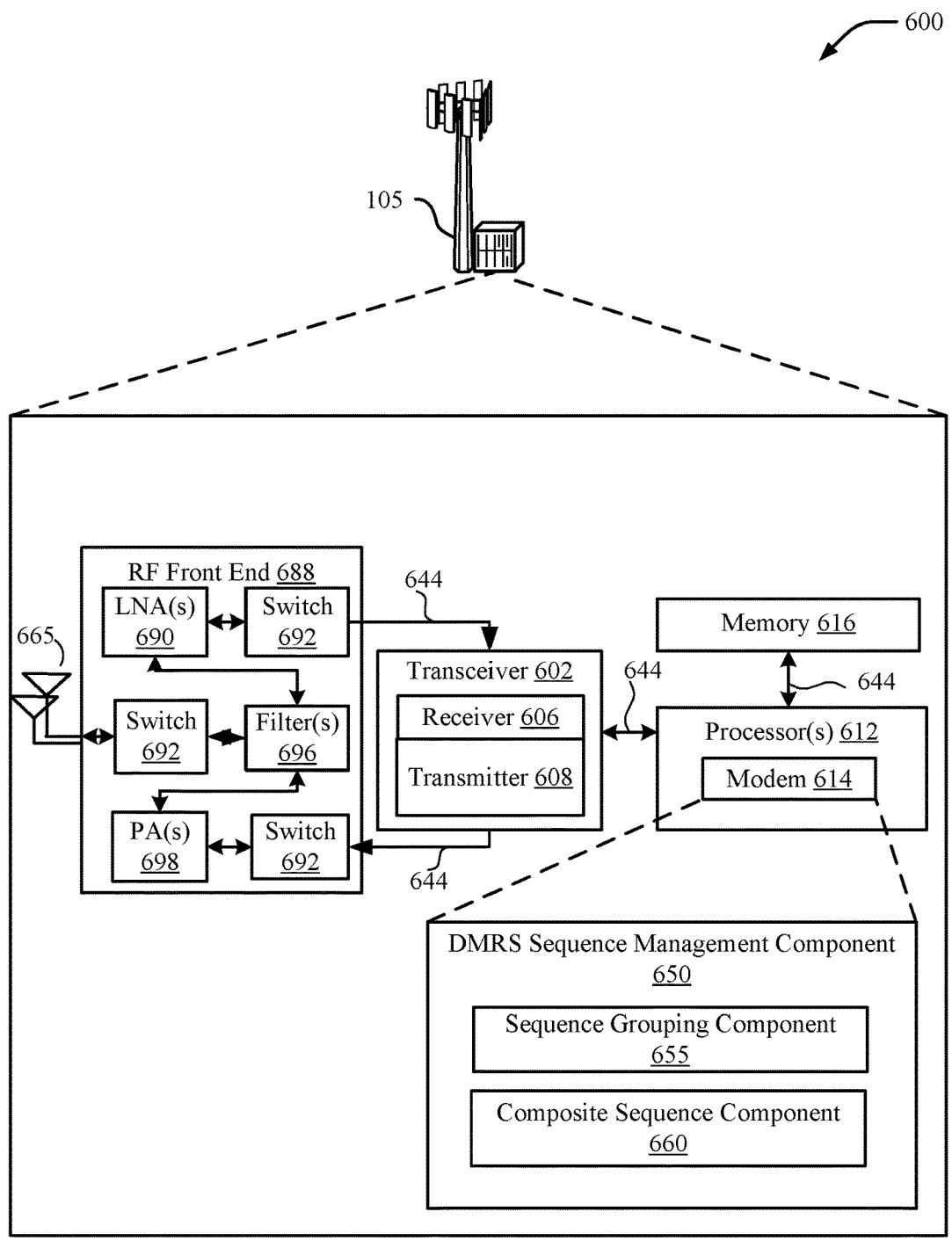
FIG. 6 is a schematic diagram of an aspect of an implementation of various components of a base station in accordance with various aspects of the present disclosure.

FIG. 6 describes hardware components and subcomponents of a device that may be a base station 105 for implementing one or more methods (e.g., method 700) described herein in accordance with various aspects of the present disclosure. For example, one example of an implementation of the transmitting device may include a variety of components, some of which have already been described above, but including components such as one or more processors 612 and memory 616 and transceiver 602 in communication via one or more buses 644, which may operate in conjunction with the DMRS sequence management component 650 to group a plurality of DMRS sequences for channel estimation based on cross correlation between the multiple sequences and cubic metric or PAPR. In some examples, the DMRS sequence management component 650 may include a sequence grouping component 655 to facilitate such grouping. The DMRS sequence management component 650 may include a composite sequence component 660 for associating the plurality of base sequences received over a plurality of time slots (or alternatively a plurality of DMRS symbols in a slot) to the transmitting UE based on cyclic shift hopping patter over subframes. Thus, the DMRS sequence management component 650 may perform functions described herein related to including one or more methods of the present disclosure.

The one or more processors 612, modem 614, memory 616, transceiver 602, RF front end 688 and one or more antennas 665, may be configured to support voice and/or data calls (simultaneously or non-simultaneously) in one or more radio access technologies. In an aspect, the one or more processors 612 can include a modem 614 that uses one or more modem processors. The various functions related to DMRS sequence management component 650 may be included in modem 614 and/or processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 614 associated with DMRS sequence management component 650 may be performed by transceiver 602.

Also, memory 616 may be configured to store data used herein and/or local versions of applications or DMRS sequence management component 650 and/or one or more of its subcomponents being executed by at least one processor 612. Memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining DMRS sequence management component 650 and/or one or more of its subcomponents, and/or data associated therewith, when base station 105 is operating at least one processor 612 to execute DMRS sequence management component 650 and/or one or more of its subcomponents.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one UE 115. Additionally, receiver 606 may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, transmitting device may include RF front end 688, which may operate in communication with one or more antennas 665 and transceiver 602 for receiving and transmitting radio transmissions, for example, wireless communications transmitted by at least one base station 105 or wireless transmissions transmitted by UE 115. RF front end 688 may be connected to one or more antennas 665 and can include one or more low-noise amplifiers (LNAs) 690, one or more switches 692, one or more power amplifiers (PAs) 698, and one or more filters 696 for transmitting and receiving RF signals. For purposes of this disclose, the term "antenna" may refer to include one or more antennas, antenna elements and/or antenna arrays.

In an aspect, LNA 690 can amplify a received signal at a desired output level. In an aspect, each LNA 690 may have a specified minimum and maximum gain values. In an aspect, RF front end 688 may use one or more switches 692 to select a particular LNA 690 and its specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and its specified gain value based on a desired gain value for a particular application.

Also, for example, one or more filters 696 can be used by RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be connected to a specific LNA 690 and/or PA 698. In an aspect, RF front end 688 can use one or more switches 692 to select a transmit or receive path using a specified filter 696, LNA 690, and/or PA 698, based on a configuration as specified by transceiver 602 and/or processor 612.

As such, transceiver 602 may be configured to transmit and receive wireless signals through one or more antennas 665 via RF front end 688. In an aspect, transceiver may be tuned to operate at specified frequencies such that transmitting device can communicate with, for example, one or more base stations 105 or one or more cells associated with one or more base stations 105. In an aspect, for example, modem 614 can configure transceiver 602 to operate at a specified frequency and power level based on the configuration of the transmitting device and the communication protocol used by modem 614.

In an aspect, modem 614 can be a multiband-multimode modem, which can process digital data and communicate with transceiver 602 such that the digital data is sent and received using transceiver 602. In an aspect, modem 614 can be multiband and be configured to support multiple frequency bands for a specific communications protocol. In an aspect, modem 614 can be multimode and be configured to support multiple operating networks and communications protocols. In an aspect, modem 614 can control one or more components of transmitting device (e.g., RF front end 688, transceiver 602) to enable transmission and/or reception of signals from the network based on a specified modem configuration. In an aspect, the modem configuration can be based on the mode of the modem and the frequency band in use.

Figure 7A:
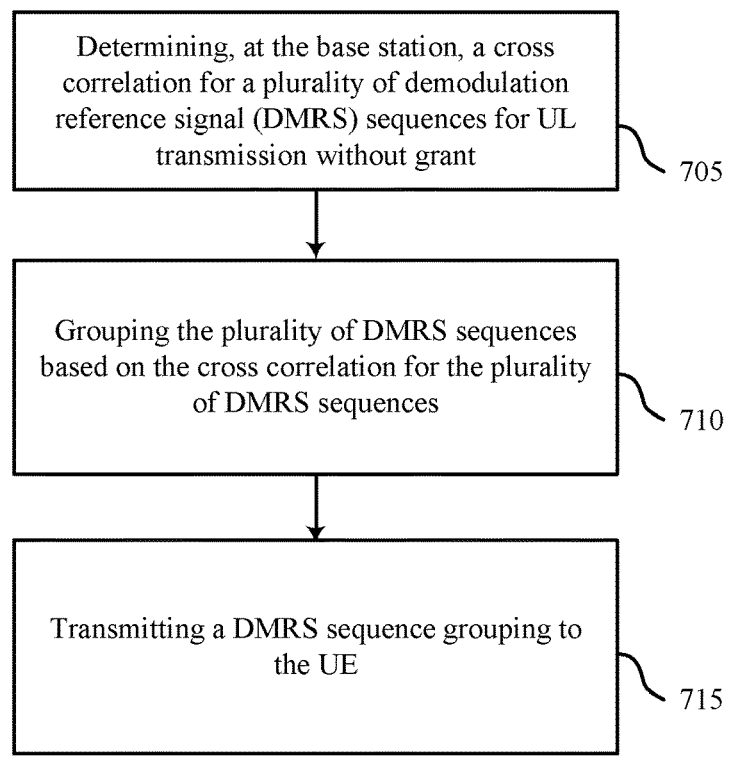
FIGS. 7A and 7B illustrate a method of wireless communication implemented by a base station in accordance with aspects of the present disclosure.

FIG. 7A is a flowchart of an example method 700 for grouping DMRS sequences for wireless communications system in accordance with aspects of the present disclosure. The method 700 may be performed using an apparatus (e.g., the base station 105). Although the method 700 is described below with respect to the elements of the base station 105, other components may be used to implement one or more of the steps described herein.

At block 705, the method may include determining, at the base station, a cross correlation for a plurality of DMRS sequence for UL transmission without a grant. The method may also include determining one or more of a cubic metric or PAPR and grouping the plurality of DMRS sequences based on the one or more of the cubic metric or the PAPR. Aspects of block 705 may be performed by the DMRS sequence management component 650 described with reference to FIG. 6.

At block 710, the method may include grouping the plurality of DMRS sequences based on the cross correlation for the plurality of DMRS sequences. The grouping may include selecting a first set of DMRs sequences from the plurality of DMRS sequences with low cross correlation for a first group. Additionally, the grouping may include selecting a second set of DMRS sequences with high cross correlation to the first set of DMRS sequences for a second group. Aspects of block 710 may be performed by the sequence grouping component 655 described with reference to FIG. 6.

At block 715, the method may include transmitting a DMRS sequence grouping to the UE. The transmitting may include broadcasting the DMRS sequence grouping in system information blocks (SIB), wherein the DMRS sequence grouping identifies a subset of DMRS sequences grouping and associated reference signal received power (RSRP) threshold for each group in the DMRS sequence grouping. The transmitting may also include broadcasting the DMRS sequence grouping in SIB, wherein the DMRS sequence grouping identifies a subset of DMRS sequences grouping and the repetition level threshold associated with UL data transmission for each group in the DMRS sequence grouping. In some examples, transmitting may also include transmitting a group number and a sequence index associated with the DMRS sequence grouping, and configuring a transmission power of the UE for the assigned DMRS sequence. Aspects of block 715 may be performed by the sequence grouping component 655 described with reference to FIG. 6.

Figure 7B:
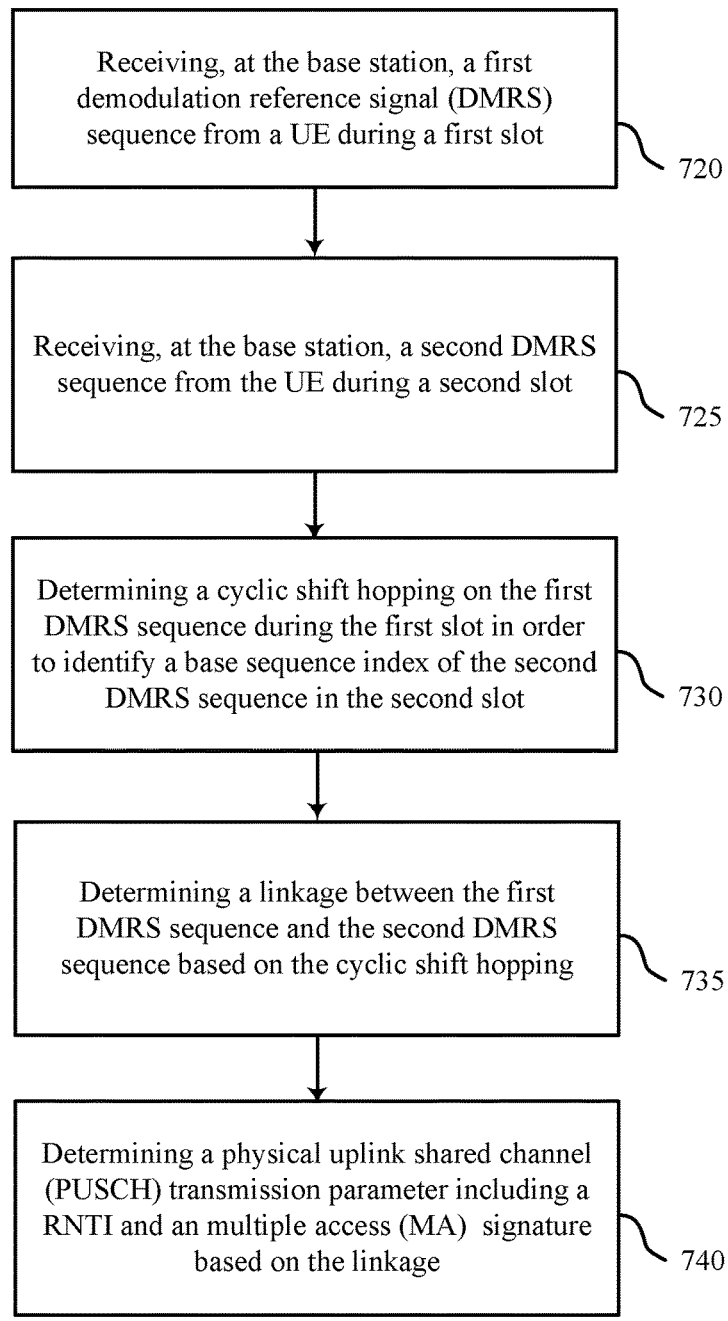

FIG. 7B is a flowchart of an example method 750 for grouping DMRS sequences for wireless communications system in accordance with aspects of the present disclosure. The method 750 may be performed using an apparatus (e.g., the base station 105). Although the method 750 is described below with respect to the elements of the base station 105, other components may be used to implement one or more of the steps described herein.

At block 720, the method may include receiving, at the base station, a first DMRS sequence from a UE during a first slot. Aspects of block 705 may be performed by the DMRS sequence management component 650 described with reference to FIG. 6.

At block 725, the method may include receiving, at the base station, a second DMRS sequence from the UE during a second slot. Aspects of block 710 may be performed by the DMRS sequence management component 650 described with reference to FIG. 6.

At block 730, the method may include determining a cyclic shift hopping on the first DMRS sequence during the first slot in order to identify a base sequence index of the second DMRS sequence in the second slot. Aspects of block 730 may be performed by the composite sequence component 660 described with reference to FIG. 6.

At block 735, the method may include determining a linkage between the first DMRS sequence and the second DMRS sequence based on the cyclic shift hopping. Aspects of block 735 may be performed by DMRS sequence management component 650 described with reference to FIG. 6.

At block 740, the method may include determining a PUSCH parameter including RNTI and MA signature based on the linkage. Aspects of block 740 may be performed by DMRS sequence management component 650 described with reference to FIG. 6.

Figure 8:
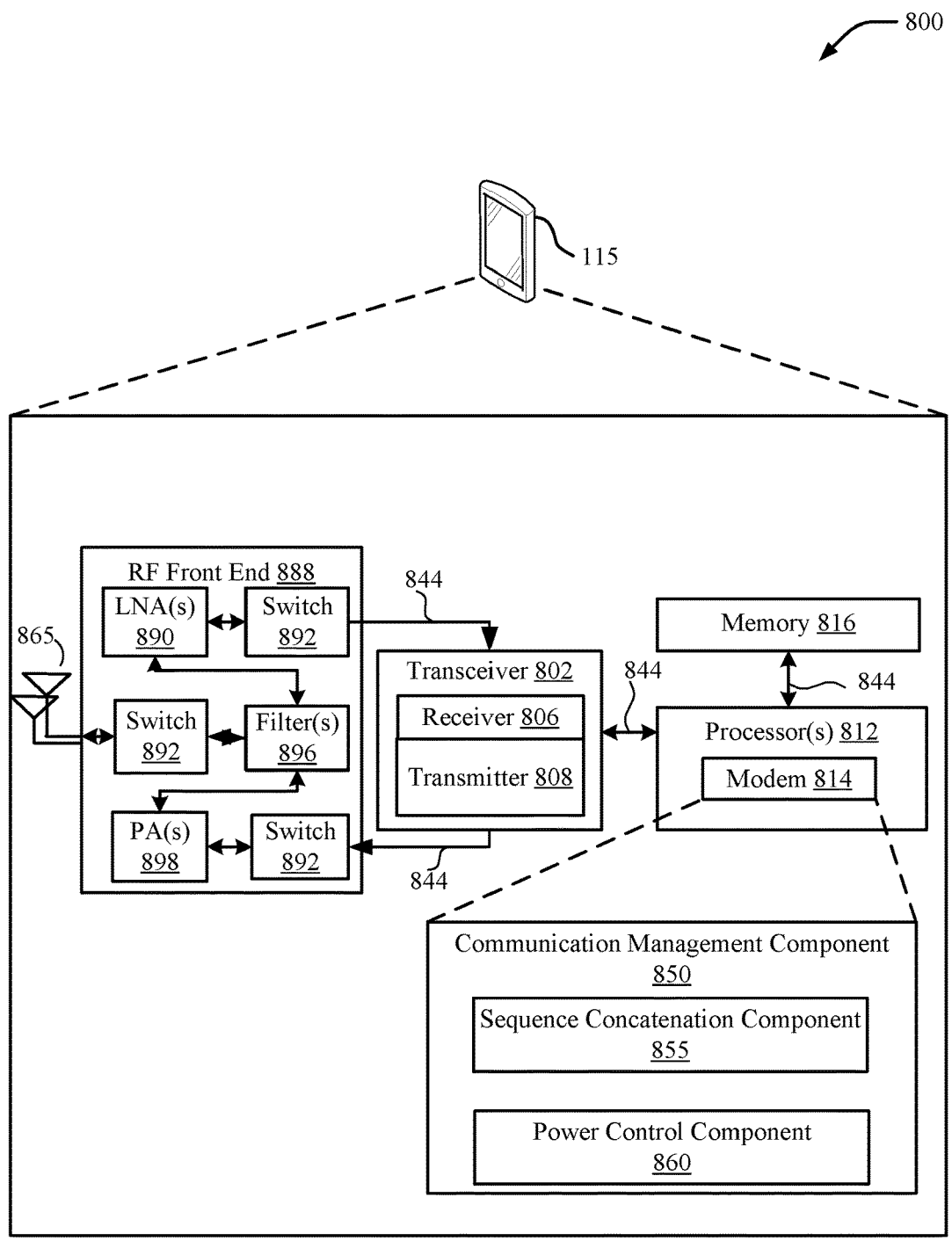
FIG. 8 is a schematic diagram of an aspect of an implementation of various components of a receiving device (e.g., UE) in accordance with various aspects of the present disclosure.

FIG. 8 describes hardware components and subcomponents of a device that may be a UE 115 for implementing one or more methods (e.g., method 900) described herein in accordance with various aspects of the present disclosure. For example, one example of an implementation of the transmitting device may include a variety of components, some of which have already been described above, but including components such as one or more processors 812 and memory 816 and transceiver 802 in communication via one or more buses 844, which may operate in conjunction with the communication management component 850 to select DMRS sequence for uplink channel estimation from a pool of DMRS sequences that are grouped based on cross correlation of the sequences and PMPR. In some examples, the communication management component 850 may include a sequence concatenation component 855 selecting a plurality of base sequences (e.g., at least two sequences) to form a set of DMRS sequences that are grouped together. Thus, the communication management component 850 may perform functions described herein related to including one or more methods of the present disclosure.

The one or more processors 812, modem 814, memory 816, transceiver 802, RF front end 888 and one or more antennas 865, may be configured to support voice and/or data calls (simultaneously or non-simultaneously) in one or more radio access technologies. In an aspect, the one or more processors 812 can include a modem 814 that uses one or more modem processors. As noted above, for purposes of this disclose, the term "antenna" may refer to include one or more antennas, antenna elements and/or antenna arrays. The various functions related to communication management component 850 may be included in modem 814 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 814 associated with communication management component 850 may be performed by transceiver 802.

Also, memory 816 may be configured to store data used herein and/or local versions of applications or communication management component 850 and/or one or more of its subcomponents being executed by at least one processor 812. Memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining communication management component 850 and/or one or more of its subcomponents, and/or data associated therewith, when UE 115 is operating at least one processor 812 to execute communication management component 850 and/or one or more of its subcomponents.

Transceiver 802 may include at least one receiver 806 and at least one transmitter 808. Receiver 806 may include hardware, firmware, and/or software code executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one UE 115. Additionally, receiver 806 may process such received signals, and also may obtain measurements of the signals, such as, but not limited to, Ec/Io, SNR, RSRP, RSSI, etc. Transmitter 808 may include hardware, firmware, and/or software code executable by a processor for transmitting data, the code comprising instructions and being stored in a memory (e.g., computer-readable medium). A suitable example of transmitter 808 may including, but is not limited to, an RF transmitter.

Moreover, in an aspect, transmitting device may include RF front end 888, which may operate in communication with one or more antennas 865 and transceiver 802 for receiving and transmitting radio transmissions, for example, wireless communications transmitted by at least one base station 105 or wireless transmissions transmitted by UE 115. RF front end 888 may be connected to one or more antennas 865 and can include one or more low-noise amplifiers (LNAs) 890, one or more switches 892, one or more power amplifiers (PAs) 898, and one or more filters 896 for transmitting and receiving RF signals.

In an aspect, LNA 890 can amplify a received signal at a desired output level. In an aspect, each LNA 890 may have a specified minimum and maximum gain values. In an aspect, RF front end 888 may use one or more switches 892 to select a particular LNA 390 and its specified gain value based on a desired gain value for a particular application.

Further, for example, one or more PA(s) 898 may be used by RF front end 588 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 can be used by RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, RF front end 888 can use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver may be tuned to operate at specified frequencies such that transmitting device can communicate with, for example, one or more base stations 105 or one or more cells associated with one or more base stations 105. In an aspect, for example, modem 814 can configure transceiver 802 to operate at a specified frequency and power level based on the configuration of the transmitting device and the communication protocol used by modem 814.

In an aspect, modem 814 can be a multiband-multimode modem, which can process digital data and communicate with transceiver 802 such that the digital data is sent and received using transceiver 802. In an aspect, modem 814 can be multiband and be configured to support multiple frequency bands for a specific communications protocol. In an aspect, modem 814 can be multimode and be configured to support multiple operating networks and communications protocols. In an aspect, modem 814 can control one or more components of transmitting device (e.g., RF front end 888, transceiver 802) to enable transmission and/or reception of signals from the network based on a specified modem configuration. In an aspect, the modem configuration can be based on the mode of the modem and the frequency band in use. In another aspect, the modem configuration can be based on UE configuration information associated with transmitting device as provided by the network during cell selection and/or cell reselection.

Figure 9:
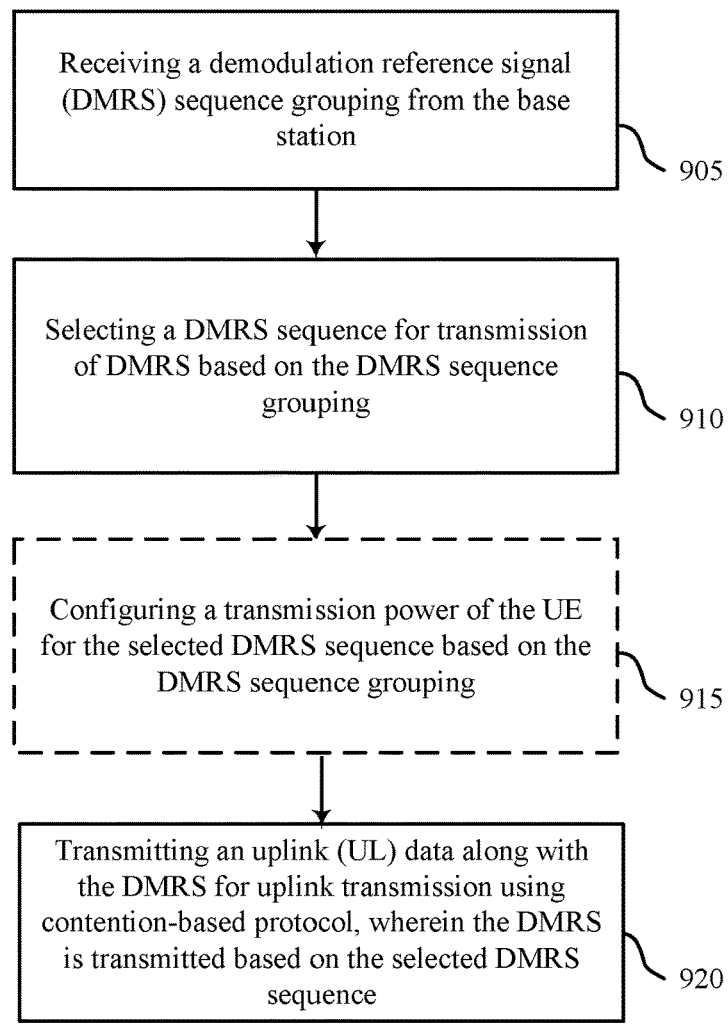
FIG. 9 is a flowchart of an example method implemented by the UE for responding to a short page message from the base station in a wireless communications system in accordance with aspects of the present disclosure.

FIG. 9 is a flowchart of an example method 900 implemented by a UE for wireless communications system in accordance with aspects of the present disclosure. The method 900 may be performed using an apparatus (e.g., the UE 115). Although the method 900 is described below with respect to the elements of the UE 115, other components may be used to implement one or more of the steps described herein.

At block 905, the method may include receiving a DMRS sequence grouping from the base station. In some examples, the DMRS sequence grouping is received from the base station in SIB. The DMRS sequence grouping may identify a subset of DMRS sequences grouping and associated RSRP threshold (or repetition level for the associated data transmission) for each group in the DMRS sequence grouping. The DMRS sequence grouping may also include a group number and a sequence index associated with the DMRS sequence grouping. Aspects of block 905 may be performed by the transceiver 802 described with reference to FIG. 8.

At block 910, the method may include selecting a DMRS sequence for transmission of DMRS for uplink transmission without grant based on the DMRS sequence grouping. Selecting the DMRS sequence for transmission of DMRS based on the DMRS sequence grouping, may comprise selecting a group number and a sequence based on the comparison of the RSRP measurement to the associated RSRP threshold for each group in the DMRS sequence grouping. In other examples, the selecting may include selecting a group number and a sequence based on the repetition level used for the associated UL data transmission. Further, selecting may include concatenating a plurality of base sequences to construct a composite DMRS sequence. In the instance of composite DMRS sequence, the UE 115 may transmit a first base sequence during a first slot and a second base sequence during a second slot. Aspects of block 910 may be performed by the communication management component 850 described with reference to FIG. 8.

At block 915, the method may optionally include configuring a transmission power of the UE for the selected DMRS sequence based on the DMRS sequence grouping. Aspects of block 915 may be performed by the power control component 860 described with reference to FIG. 8.

At block 920, the method may include transmitting an uplink data along with the DMRS for uplink transmission using contention-based protocol (e.g., without L1 grant). In some examples, the DMRS may be transmitted based on the selected DMRS sequence. The method may also include transmitting the composite DMRS sequence in the two consecutive slots of a plurality subframes (or alternatively two DMRS symbols in a slot), and performing a cyclic shift hopping on the first DMRS sequence based on the base sequence index of the second DMRS sequence. The method may further include performing a cyclic shift hopping on the second DMRS sequence based on the base sequence index of the first DMRS sequence. Aspects of block 920 may be performed by the transceiver 802 described with reference to FIG. 8.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV- DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications implemented by a user equipment (UE), comprising:
receiving a demodulation reference signal (DMRS) sequence grouping from a base station;
selecting a DMRS sequence for transmission of DMRS based on the DMRS sequence grouping; and
transmitting uplink (UL) data along with the DMRS for UL transmission using contention-based protocol, wherein the DMRS is transmitted based on the selected DMRS sequence,
wherein selecting the DMRS sequence for transmission of DMRS based on the DMRS sequence grouping comprises concatenating a plurality of base sequences to construct a composite DMRS sequence, wherein the plurality of base sequences includes at least two sequences, the method further comprising:
transmitting the composite DMRS sequence in one or more of slots of a plurality subframes, wherein a first DMRS sequence is transmitted in a first slot and a second DMRS sequence is transmitted in a second slot;
performing a cyclic shift hopping on the first DMRS sequence based on a base sequence index of the second DMRS sequence; and
performing a cyclic shift hopping on the second DMRS sequence based on a base sequence index of the first DMRS sequence.

2. The method of claim 1, wherein the DMRS sequence grouping is received from the base station in system information blocks (SIB), and
wherein the DMRS sequence grouping identifies a subset of DMRS sequence grouping and an associated reference signal received power (RSRP) threshold for each group in the DMRS sequence grouping.

3. The method of claim 1, wherein receiving the DMRS sequence grouping comprises:
receiving a group number and a sequence index associated with the DMRS sequence grouping.

4. The method of claim 1, further comprising:
configuring a transmission power of the UE for the selected DMRS sequence based on the DMRS sequence grouping.

5. An apparatus configured for wireless communications, comprising:
a memory comprising computer-executable instructions; and
one or more processors communicatively coupled with the memory, the one or more processors configured to execute the computer-executable instructions and cause the apparatus to:
receive a demodulation reference signal (DMRS) sequence grouping from a base station;
select a DMRS sequence for transmission of DMRS based on the DMRS sequence grouping; and
transmit an uplink (UL) data along with the DMRS for UL transmission using contention-based protocol, wherein the DMRS is transmitted based on the selected DMRS sequence,
wherein the one or more processors are configured to execute the computer-executable instructions and cause the apparatus to: select the DMRS sequence for transmission of DMRS based on the DMRS sequence grouping by concatenating a plurality of base sequences to construct a composite DMRS sequence, wherein the plurality of base sequences includes at least two sequences,
wherein the one or more processors are further configured to execute the computer-executable instructions and cause the apparatus to:
transmit the composite DMRS sequence in one or more slots of a plurality subframes, wherein a first DMRS sequence is transmitted in a first slot and a second DMRS sequence is transmitted in a second slot;
perform a cyclic shift hopping on the first DMRS sequence based on a base sequence index of the second DMRS sequence; and
perform a cyclic shift hopping on the second DMRS sequence based on a base sequence index of the first DMRS sequence.

6. The apparatus of claim 5, wherein the one or more processors are configured to execute the computer-executable instructions and cause the apparatus to:
receive the DMRS sequence grouping in system information blocks (SIB),
wherein the DMRS sequence grouping identifies a subset of DMRS sequence grouping and associated reference signal received power (RSRP) threshold for each group in the DMRS sequence grouping.

7. The apparatus of claim 5, wherein the one or more processors are configured to execute the computer-executable instructions and cause the apparatus to:
receive the DMRS sequence grouping by receiving a group number and a sequence index associated with the DMRS sequence grouping.

8. The apparatus of claim 5, wherein the one or more processors are configured to execute the computer-executable instructions and cause the apparatus to:
configure a transmission power of the UE for the selected DMRS sequence based on the DMRS sequence grouping.

9. A non-transitory computer-readable medium comprising computer-executable instructions that, when executed by one or more processors of a user equipment (UE), cause the UE to perform a method of wireless communication, the method comprising:
receiving a demodulation reference signal (DMRS) sequence grouping from a base station;
selecting a DMRS sequence for transmission of DMRS based on the DMRS sequence grouping; and
transmitting uplink (UL) data along with the DMRS for UL transmission using contention-based protocol, wherein the DMRS is transmitted based on the selected DMRS sequence,
wherein selecting the DMRS sequence for transmission of DMRS based on the DMRS sequence grouping comprises concatenating a plurality of base sequences to construct a composite DMRS sequence, wherein the plurality of base sequences includes at least two sequences, the method further comprising:
transmitting the composite DMRS sequence in one or more of slots of a plurality subframes, wherein a first DMRS sequence is transmitted in a first slot and a second DMRS sequence is transmitted in a second slot;
performing a cyclic shift hopping on the first DMRS sequence based on a base sequence index of the second DMRS sequence; and
performing a cyclic shift hopping on the second DMRS sequence based on a base sequence index of the first DMRS sequence.

10. The non-transitory computer-readable medium of claim 9, wherein the DMRS sequence grouping is received from the base station in system information blocks (SIB), and wherein the DMRS sequence grouping identifies a subset of DMRS sequence grouping and an associated reference signal received power (RSRP) threshold for each group in the DMRS sequence grouping.

11. The non-transitory computer-readable medium of claim 9, wherein receiving the DMRS sequence grouping comprises:
receiving a group number and a sequence index associated with the DMRS sequence grouping.

12. The non-transitory computer-readable medium of claim 9, the method further comprising:
configuring a transmission power of the UE for the selected DMRS sequence based on the DMRS sequence grouping.

* * * * *